A. POYNTER.
MOUSE TRAP.
APPLICATION FILED AUG. 2, 1916.
1,208,206.
Patented Dec. 12, 1916.
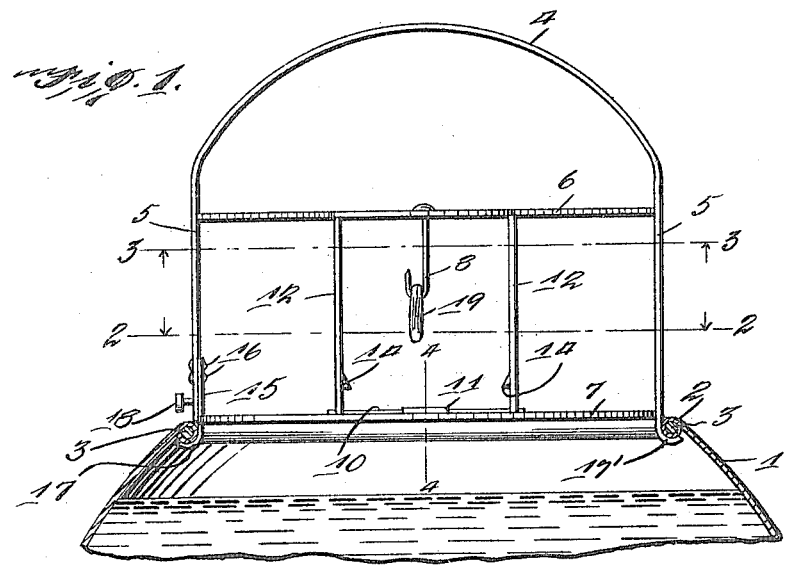
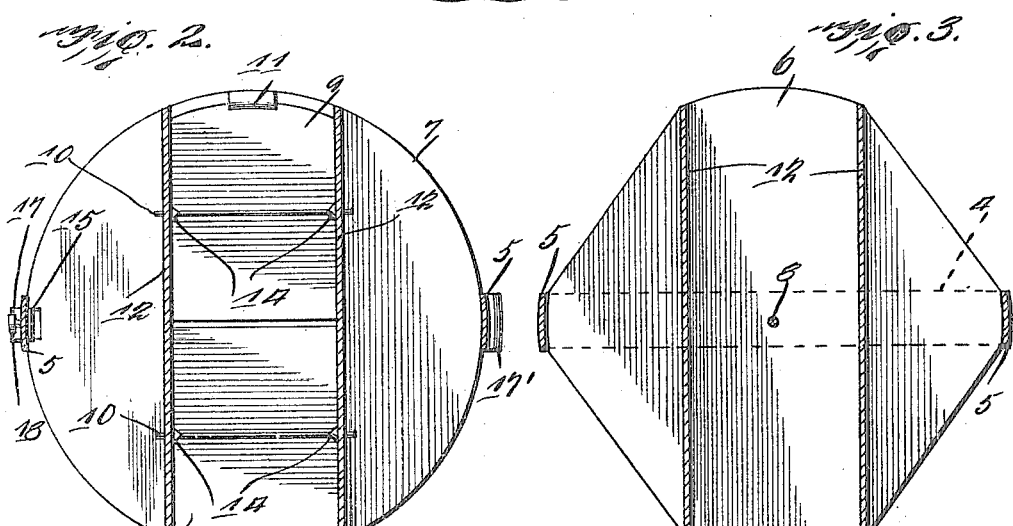
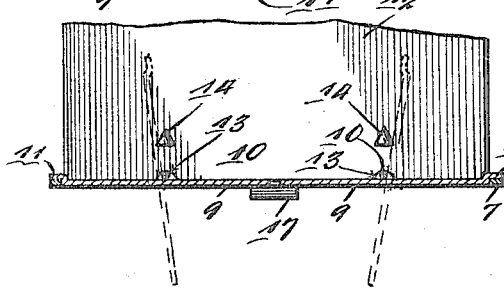
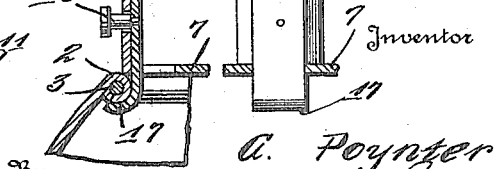
Inventor
A. Poynter
By E. E. Vrooman & Co.,
his Attorneys

UNITED STATES PATENT OFFICE.

ALOIS POYNTER, OF EDEN, SOUTH DAKOTA.

MOUSE-TRAP.

1,208,206. Specification of Letters Patent. Patented Dec. 12, 1916.

Application filed August 2, 1916. Serial No. 112,762.

*To all whom it may concern:*

Be it known that I, ALOIS POYNTER, a citizen of the United States of America, residing at Eden, in the county of Marshall and State of South Dakota, have invented certain new and useful Improvements in Mouse-Traps, of which the following is a specification, reference being had therein to the accompanying drawing.

This invention relates to mouse traps and has for its principal object the production of a trap which may be fixedly secured to the top of a basin whereby mice may be caught in said basin.

Another object of this invention is the production of a trap which is provided with a plurality of trap doors which will normally be positioned in a horizontal plane.

Another object of this invention is in the production of simple and efficient means for attaching a trap to a basin.

With these and other objects in view, this invention consists of certain novel combinations, constructions and arrangements of parts as will be hereinafter fully described and claimed.

In the drawings:—Figure 1 is a front elevation of the device, showing the basin in section. Fig. 2 is a section taken on the line 2—2 of Fig. 1, looking in the direction of the arrows. Fig. 3 is a section taken on the line 3—3 of Fig. 1, looking in the direction of the arrows. Fig. 4 is a section taken on the line 4—4 of Fig. 1. Fig. 5 is an enlarged section through a portion of the device, showing how the locking means is operated. Fig. 6 is a rear elevation of the locking means.

By referring to the drawings by numerals, it will be seen that 1 designates a basin which is provided with the upper inner rolled edge 2, which edge is reinforced by means of the wire 3. Upon this basin 1 is positioned the trap proper. This trap consists of the handle 4 which is provided with the vertically-extending strips 5. Mounted upon these strips 5 are the upper plate 6 and the lower plate 7. It will be seen by referring to Fig. 3 that the upper plate 6 is substantially hexagonal in shape and is provided with an opening adapted to receive the bait-hook 8. By referring to Fig. 2 it will be seen that the bottom plate 7 is circular in shape and is provided with a plurality of trap-doors 9. These trap-doors 9 are mounted upon the axles 10 whereby the same may be rotated or swung to an open position. By referring more especially to Fig. 4, it will be noticed that these trap-doors are provided with the stop lips 11 so that the trap door will only be swung from their center portions.

It will be noticed that the trap is provided with a plurality of inner walls 12 which are connected to the plates 6 and 7, and are situated along the edges of the trap-doors 9. These walls 12 are provided with a plurality of openings 13 along their lower edge so as to receive the axle 10, as is clearly shown in Figs. 2 and 4. It will also be noticed that these walls are provided with a plurality of struck-out lips 14 which are situated a spaced distance above the openings 13, whereby it will be impossible for the trap-door to take a vertical position as is clearly shown in Fig. 4, so that when the same is in an open position and is free, it will readily fall back to its normal horizontal position.

It will be noticed that the strips 5 are provided with means for attaching the trap proper to the basin 1. Upon one strip is mounted the spring-clip 15 by means of the rivets 16. This spring-clip is provided with the outwardly-extending gripping portion 17 which is adapted to engage the inner rolled edge 2 of the basin 1. The strip 5 is provided with an aperture through which the push button 18 is adapted to go and engage the spring-clip 15, whereby the button may be pressed which will release the spring-clip from the edge 2 or will situate it so that it may be released so as to engage the edge 2. The other strip 5, it will be seen, extends down so as to form the gripping lip 17' which engages the inner edge 2 in the same manner as the gripping lip 17.

When this device is in operation, the bait 19 is first hung upon the hook 8 and is adapted to attract the attention of the mouse. When the mouse walks over the trap-doors 9, it will be seen that when he reaches the inner portions thereof, the trap-doors will open because of his weight and he will then fall a prisoner into the basin 1 and the trap-doors will automatically drop back into a horizontal position. It will be seen that by this construction an ever-ready trap has been produced.

It should also be noted that because of the peculiar arrangement of the walls 12 and the plates 6 and 7, it will be impossible for the mouse to obtain the bait 19 without walking upon the inner portions of the trap-doors 9.

It is, of course, obvious that if so desired water may be placed in the basin 1 in order that when the mouse drops through the trap doors he will fall into this water and be drowned.

Having thus described my invention, what is claimed as new is:—

A device of the class described, comprising a handle bent so as to form a gripping portion, vertically extending supporting strips, an upper and a lower horizontally extending plate fixedly secured to said supporting strips, bait means provided upon said upper plate, vertically extending guard walls connecting said upper plate to said lower plate, horizontally extending trap doors mounted upon said lower plate, stop lips provided upon the outer edges of said trap doors, struck-out portions provided on said guard walls a spaced distance above the axles of said trap doors, whereby said trap doors will be prevented from rotating past a given point, and means for attaching the device to a suitable catching receptacle.

In testimony whereof I hereunto affix my signature.

ALOIS POYNTER.

Copies of this patent may be obtained for five cents each, by addressing the "Commissioner of Patents, Washington, D. C."